(12) United States Patent
Zhao et al.

(10) Patent No.: US 11,457,443 B2
(45) Date of Patent: Sep. 27, 2022

(54) METHOD FOR TRANSMITTING CONFIGURATION INFORMATION AND TERMINAL DEVICE

(71) Applicant: GUANGDONG OPPO MOBILE TELECOMMUNICATIONS CORP., LTD., Guangdong (CN)

(72) Inventors: Zhenshan Zhao, Guangdong (CN); Qianxi Lu, Guangdong (CN); Huei-Ming Lin, South Yarra (AU)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 0 days.

(21) Appl. No.: 17/189,253

(22) Filed: Mar. 1, 2021

(65) Prior Publication Data
US 2021/0185674 A1    Jun. 17, 2021

Related U.S. Application Data

(63) Continuation of application No. PCT/CN2018/104671, filed on Sep. 7, 2018.

(51) Int. Cl.
*H04W 72/04* (2009.01)
*H04W 4/40* (2018.01)

(52) U.S. Cl.
CPC ......... *H04W 72/0446* (2013.01); *H04W 4/40* (2018.02)

(58) Field of Classification Search
CPC .............................. H04W 72/0446; H04W 4/40
See application file for complete search history.

(56) References Cited

U.S. PATENT DOCUMENTS

| | | | |
|---|---|---|---|
| 9,769,862 | B2 | 9/2017 | Sheng |
| 9,826,563 | B2 | 11/2017 | Sheng |

(Continued)

FOREIGN PATENT DOCUMENTS

| | | |
|---|---|---|
| CN | 105451211 A | 3/2016 |
| CN | 106211027 A | 12/2016 |

(Continued)

OTHER PUBLICATIONS

International Search Report in the international application No. PCT/CN2018/104671, dated May 29, 2019.

(Continued)

*Primary Examiner* — Zhiren Qin
(74) *Attorney, Agent, or Firm* — Perkins Coie LLP

(57) ABSTRACT

Provided are a method for transmitting configuration information and a terminal device, which may improve the data transmission performance between terminal devices in a Device to Device (D2D) system. The method includes that: a first terminal device sends a first sidelink transmission channel, the first sidelink transmission channel being configured to indicate at least one of the following configuration information: configuration information of a slot format, configuration information of a bandwidth part (BWP), configuration information of a synchronization resource on at least one carrier and configuration information of a synchronization resource on at least one BWP, and the configuration information indicated by the first sidelink transmission channel being used for communication between the first terminal device and a second terminal device.

17 Claims, 6 Drawing Sheets

(56) References Cited

U.S. PATENT DOCUMENTS

| | | | |
|---|---|---|---|
| 9,913,310 | B2 | 3/2018 | Lee et al. |
| 2016/0302249 | A1 | 10/2016 | Sheng |
| 2016/0302250 | A1 | 10/2016 | Sheng |
| 2017/0006583 | A1* | 1/2017 | Tavildar ................ H04W 72/04 |
| 2017/0086081 | A1* | 3/2017 | Kim ...................... H04W 4/027 |
| 2017/0127413 | A1* | 5/2017 | Guan ................ H04W 72/0453 |
| 2017/0181206 | A1 | 6/2017 | Lee et al. |
| 2017/0188391 | A1* | 6/2017 | Rajagopal ......... H04W 28/0284 |
| 2017/0245245 | A1* | 8/2017 | Kim ................... H04W 72/1284 |
| 2017/0280469 | A1* | 9/2017 | Park ...................... H04W 76/14 |
| 2017/0289733 | A1* | 10/2017 | Rajagopal ............... H04W 4/70 |
| 2017/0353936 | A1 | 12/2017 | Zhang et al. |
| 2018/0049142 | A1* | 2/2018 | Yang ................... H04W 56/002 |
| 2018/0049162 | A1* | 2/2018 | Patil ...................... H04W 72/04 |
| 2018/0124808 | A1* | 5/2018 | Yang ..................... H04W 72/02 |
| 2018/0279242 | A1 | 9/2018 | Kwak et al. |
| 2018/0279303 | A1* | 9/2018 | Sun ................... H04W 72/1278 |
| 2018/0309513 | A1* | 10/2018 | Kim ...................... H04B 7/2643 |
| 2018/0343692 | A1 | 11/2018 | Lee et al. |
| 2018/0376476 | A1* | 12/2018 | Lee ........................ H04L 5/0053 |
| 2019/0037622 | A1 | 1/2019 | Blasco Serrano et al. |
| 2019/0045469 | A1 | 2/2019 | Zhang et al. |
| 2019/0053267 | A1* | 2/2019 | Kim ................... H04W 72/1242 |
| 2019/0059113 | A1* | 2/2019 | He ..................... H04W 74/0833 |
| 2019/0320457 | A1* | 10/2019 | Maaref ................ H04W 76/27 |
| 2020/0092880 | A1* | 3/2020 | Choi ................... H04W 72/042 |
| 2020/0187252 | A1* | 6/2020 | Lee ..................... H04B 17/3913 |
| 2020/0275418 | A1* | 8/2020 | Wong ................... H04L 5/0007 |
| 2021/0051627 | A1* | 2/2021 | Lee ........................ H04L 1/0003 |
| 2021/0153170 | A1* | 5/2021 | Chen ................ H04W 72/0446 |
| 2021/0235471 | A1* | 7/2021 | Osawa ............. H04W 72/1268 |
| 2021/0306101 | A1* | 9/2021 | Okamura ............. H04L 1/0668 |

FOREIGN PATENT DOCUMENTS

| | | |
|---|---|---|
| CN | 107046461 A | 8/2017 |
| CN | 107734557 A | 2/2018 |
| CN | 107852727 A | 3/2018 |
| EP | 3293901 A1 | 3/2018 |
| WO | 2014086204 A1 | 6/2014 |
| WO | 2015163625 A1 | 10/2015 |
| WO | 2017134235 A1 | 8/2017 |

OTHER PUBLICATIONS

Itri. "Synchronization Considerations for Type 1 Discovery", 3GPP TSG RAN WG1 Meeting #81 R1-152947, May 29, 2015 (May 29, 2015), sections 1-2, and figures 1-2.

Huawei et al. "Interference Control for Out-of-Coverage Discovery", 3GPP TSG RAN WG1 Meeting #80bis R1-152150, Apr. 24, 2015 (Apr. 24, 2015), entire document.

Intel Corporation. "Remaining Details of Sidelink Synchronization Procedure for V2V Communication", 3GPP TSG RAN WG1 Meeting #88 R1-1702855, Feb. 17, 2017 (Feb. 17, 2017), entire document.

International Search Report in the international application No. PCT/CN2018/108471, dated May 29, 2019.

Xiaomi Communications: "On synchronization for NR V2X", 3GPP Draft; R1-1809177 3rd Generation Partnership Project (3GPP), vol. RAN WG1, No. Gothenburg, Sweden; Aug. 20, 2018-Aug. 24, 2018 Aug. 10, 2018 (Aug. 10, 2018), XP051516547. 2 pages.

Supplementary European Search Report in the European application No. 18932624.2, dated Jul. 22, 2021. 30 pages.

Office Action in the Indian application No. 202117013630, dated Feb. 7, 2022. 6 pages with English translation.

Intel Corporation: "On group-common PDCCH", 3GPP Draft; R1-1717380 Intel GC-PDCCH, vol. RAN WG1, No. Prague, Czech Republic; Oct. 9, 2017-Oct. 13, 2017 Oct. 8, 2017 (Oct. 8, 2017), XP051340570. 12 pages.

First Office Action in the European application No. 18932624.2, dated May 6, 2022. 7 pages.

First Office Action in the Chinese application No. 202110406523.6, dated Aug. 9, 2022. 22 pages with English Translation.

* cited by examiner

METHOD FOR TRANSMITTING CONFIGURATION INFORMATION AND TERMINAL DEVICE

REFERENCE TO RELATED APPLICATION

This application is a continuation of International Patent Application No. PCT/CN2018/104671 filed on Sep. 7, 2018, the content of which is hereby incorporated in its entirety.

TECHNICAL FIELD

Embodiments of the disclosure relate to the field of communication, and more particularly to a method for transmitting configuration information and a terminal device.

BACKGROUND

The Internet of vehicles or Vehicle to Everything (V2X) communication is a sidelink transmission technology based on Device to Device (D2D) communication. Unlike a conventional Long Term Evolution (LTE) system in which data is received or sent through a base station, an Internet of vehicles system adopts D2D communication and thus is higher in spectrum efficiency and lower in transmission delay.

5th-Generation (5G) New Radio (NR) needs to support self-driving. Thus, higher requirements, for example, requirements on a higher throughput, a lower delay, a higher reliability, a wider coverage and a more flexible resource allocation manner, are made to data transmission performance between vehicles. Therefore, how to improve data transmission performance between terminal devices in NR-V2X becomes a problem needed to be solved.

SUMMARY

The embodiments of the disclosure provide a method for transmitting configuration information and a terminal device.

A first aspect provides a method for transmitting configuration information, which may include that: a first terminal device sends a first sidelink transmission channel, the first sidelink transmission channel being configured to indicate at least one of the following configuration information: configuration information of a slot format, configuration information of a bandwidth part (BWP), configuration information of a synchronization resource on at least one carrier and configuration information of a synchronization resource on at least one BWP, and the configuration information indicated by the first sidelink transmission channel being used for communication between the first terminal device and a second terminal device.

A second aspect provides a method for transmitting configuration information, which may include that: a second terminal device receives a first sidelink transmission channel, the first sidelink transmission channel being configured to indicate at least one of the following configuration information: configuration information of a slot format, configuration information of a BWP, configuration information of a synchronization resource on at least one carrier and configuration information of a synchronization resource on at least one BWP, and the configuration information indicated by the first sidelink transmission channel being used for communication between a first terminal device and the second terminal device.

A third aspect provides a terminal device, which may execute the method in the first aspect or any optional implementation mode of the first aspect. Specifically, the terminal device may include functional modules configured to execute the method in the first aspect or any possible implementation mode of the first aspect.

A fourth aspect provides a terminal device, which may execute the method in the second aspect or any optional implementation mode of the second aspect. Specifically, the terminal device may include functional modules configured to execute the method in the second aspect or any possible implementation mode of the second aspect.

A fifth aspect provides a terminal device, which may include a processor and a memory. The memory may be configured to store a computer program, and the processor may be configured to call and run the computer program stored in the memory to execute the method in the first aspect tor any possible implementation mode of the first aspect.

A sixth aspect provides a terminal device, which may include a processor and a memory. The memory may be configured to store a computer program, and the processor may be configured to call and run the computer program stored in the memory to execute the method in the second aspect tor any possible implementation mode of the second aspect.

A seventh aspect provides a chip, which is configured to implement the method in the first aspect or any possible implementation mode of the first aspect. Specifically, the chip may include a processor, configured to call and run a computer program in a memory to enable a device installed with the chip to execute the method in the first aspect or any possible implementation mode of the first aspect.

An eighth aspect provides a chip, which is configured to implement the method in the second aspect or any possible implementation mode of the second aspect. Specifically, the chip may include a processor, configured to call and run a computer program in a memory to enable a device installed with the chip to execute the method in the second aspect or any possible implementation mode of the second aspect.

A ninth aspect provides a computer-readable storage medium, which may be configured to store a computer program, the computer program enabling a computer to execute the method in the first aspect or any possible implementation mode of the first aspect.

A tenth aspect provides a computer-readable storage medium, which may be configured to store a computer program, the computer program enabling a computer to execute the method in the second aspect or any possible implementation mode of the second aspect.

An eleventh aspect provides a computer program product, which may include a computer program instruction, the computer program instruction enabling a computer to execute the method in the first aspect or any possible implementation mode of the first aspect.

A twelfth aspect provides a computer program product, which may include a computer program instruction, the computer program instruction enabling a computer to execute the method in the second aspect or any possible implementation mode of the second aspect.

A thirteenth aspect provides a computer program, which may run in a computer to enable the computer to execute the method in the first aspect or any possible implementation mode of the first aspect.

A fourteenth aspect provides a computer program, which may run in a computer to enable the computer to execute the method in the second aspect or any possible implementation mode of the second aspect.

A fifteenth aspect provides a communication system, which may include a first terminal device and a second terminal device.

The first terminal device is configured to send a first sidelink transmission channel. The first sidelink transmission channel is configured to indicate at least one of the following configuration information: configuration information of a slot format, configuration information of a BWP, configuration information of a synchronization resource on at least one carrier and configuration information of a synchronization resource on at least one BWP. The configuration information indicated by the first sidelink transmission channel is used for communication between the first terminal device and the second terminal device.

The second terminal device is configured to receive the first sidelink transmission channel. The first sidelink transmission channel is configured to indicate at least one of the following configuration information: the configuration information of the slot format, the configuration information of the BWP, the configuration information of the synchronization resource on the at least one carrier and the configuration information of the synchronization resource on the at least one BWP. The configuration information indicated by the first sidelink transmission channel is used for communication between the first terminal device and the second terminal device.

Furthermore, the first terminal device is configured to execute the method in the first aspect or any possible implementation mode of the first aspect, and the second terminal device is configured to execute the method in the second aspect or any possible implementation mode of the second aspect.

DETAILED DESCRIPTION

It is to be understood that the technical solutions of the embodiments of the disclosure may be applied to various communication systems, for example, a Global System of Mobile Communication (GSM), a Code Division Multiple Access (CDMA) system, a Wideband Code Division Multiple Access (WCDMA) system, an LTE system, an LTE Frequency Division Duplex (FDD) system, LTE Time Division Duplex (TDD), a Universal Mobile Telecommunication System (UMTS) and a future 5G communication system.

Each embodiment of the disclosure is described in combination with a terminal device. The terminal device may also refer to User Equipment (UE), an access terminal, a user unit, a user station, a mobile radio station, a mobile station, a remote station, a remote terminal, a mobile device, a user terminal, a terminal, a wireless communication device, a user agent, a user device or the like. The access terminal may be a cell phone, a cordless phone, a Session Initiation Protocol (SIP) phone, a Wireless Local Loop (WLL) station, a Personal Digital Assistant (PDA), a handheld device with a wireless communication function, a computing device, another processing device connected to a wireless modem, a vehicle-mounted device, a wearable device, a terminal device in a future 5G network, a terminal device in a future evolved Public Land Mobile Network (PLMN) or the like.

Each embodiment of the disclosure is described in combination with a network device. The network device may be a device configured to communicate with the terminal device. For example, the network device may be a Base Transceiver Station (BTS) in a GSM or CDMA, or may be a NodeB (NB) in a WCDMA system or may be an Evolutional Node B (eNB or eNodeB) in a LTE system. Or the network device may be a relay station, an access point, a vehicle-mounted device, a wearable device, a network-side device in a future 5G network, a network-side device in a future evolved PLMN or the like.

Figure 1:
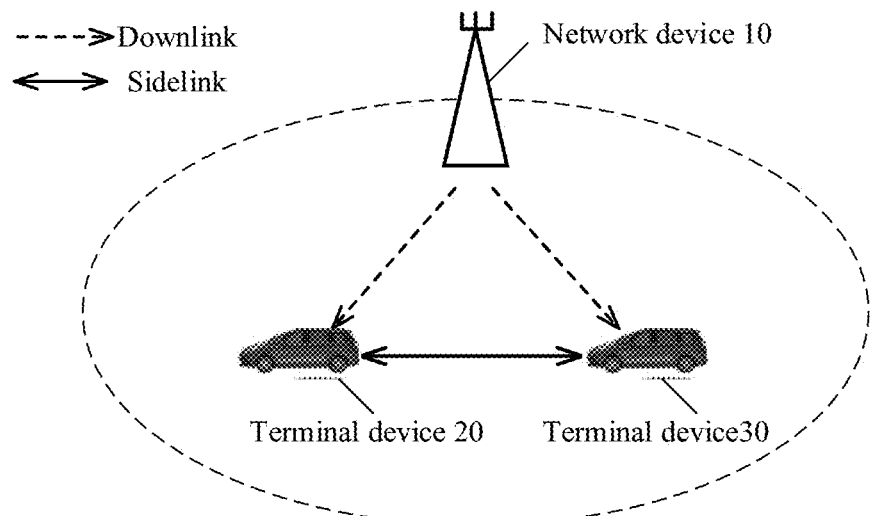
FIG. 1 is a schematic architecture diagram of an application scenario according to an embodiment of the disclosure.
Figure 2:
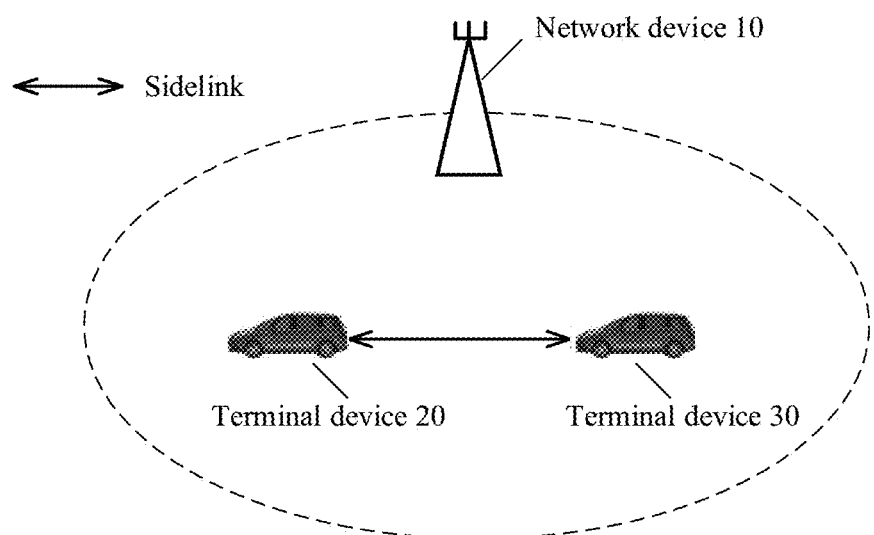
FIG. 2 is a schematic architecture diagram of another application scenario according to an embodiment of the disclosure.

FIG. 1 and FIG. 2 are schematic diagrams of possible application scenarios according to the embodiments of the disclosure. A network device and two terminal devices are exemplarily shown in FIG. 1. In an implementation, a wireless communication system may include multiple network devices and another number of terminal devices included in coverage of each network device. No limits are made thereto in the embodiments of the disclosure.

In addition, the wireless communication system may further include another network entity such as a Mobile Management Entity (MME), a Serving Gateway (S-GW) and a Packet data Network Gateway (P-GW). However, the embodiments of the disclosure are not limited thereto.

A terminal device 20 may communicate with a terminal device 30 in a D2D communication mode. During D2D communication, the terminal device 20 can directly communicate with the terminal device 30 through a D2D link, i.e., a sidelink (SL). For example, as shown in FIG. 1 or FIG. 2, the terminal device 20 directly communicates with the terminal device 30 through the SL. In FIG. 1, the terminal device 20 communicates with the terminal device 30 through the SL, and a transmission resource is allocated by a network device. In FIG. 2, the terminal device 20 communicates with the terminal device 30 through the SL, a transmission resource is selected independently by the terminal devices, and the transmission resource is not required to be allocated by the network device.

D2D communication may refer to Vehicle to Vehicle (V2V) communication or V2X communication. In V2X communication, X generally refers to any device with a wireless receiving and sending capability, for example, but not limited to, a wireless device moving at a low speed, a vehicle device moving at a high speed or a network control node with a wireless transmitting and receiving capability, etc. It is to be understood that the embodiments of the disclosure are mainly applied to a V2X communication scenario but may also be applied to any other D2D communication scenario. No limits are made thereto in the embodiments of the disclosure.

In the Internet of vehicles, two transmission modes are defined, i.e., transmission mode 3 (mode 3) and transmission mode 4 (mode 4). In the transmission mode 3, a transmission resource of a terminal device may be allocated by a base station, and the terminal device may perform data transmission on a sidelink based on the resource allocated by the base station. The base station may allocate a resource for single transmission to the terminal device or may allocate a resource for semi-persistent transmission to the terminal device. In the transmission mode 4, a terminal device, if having a sensing capability, may transmit data in a manner combining sensing and reservation. If having no sensing capability, the terminal device may randomly select a transmission resource from a resource pool. The terminal device having the sensing capability may acquire an available transmission resource set from the resource pool in a sensing manner, and may randomly select a resource from the available resource set for data transmission. Since a service in an Internet of vehicles system is periodic, a terminal device usually adopts a semi-persistent transmission manner, namely the terminal device, after selecting a transmission resource, may keep using the resource in multiple transmission cycles. Therefore, probabilities of resource reselection and resource conflict can be reduced. The terminal device may include information of a resource reserved for next transmission into control information transmitted this time such that another terminal device can detect the control information sent by the terminal device and determine the resource reserved and used by the terminal device to achieve the purpose of reducing resource conflicts.

During sidelink transmission, a terminal device may use a dedicated carrier sidelink for data transmission or share a sidelink carrier for sidelink transmission. When a sidelink and an uplink share a carrier, the sidelink may occupy a transmission resource of the uplink, for example, using an uplink subframe in a TDD system or using an uplink carrier in an FDD system. However, for avoiding interferences to another terminal device, a sidelink cannot occupy a transmission resource of a downlink.

In an NR system, a terminal device in a cell supports different slot structures during uplink and downlink transmission. Namely a slot may include at least one of a downlink symbol, an uplink symbol and a flexible symbol. The number of symbols of each type may be flexibly configured. The downlink symbol is used for downlink transmission, the uplink symbol is used for uplink transmission, and the flexible symbol represents an indeterminate transmission direction. However, the terminal device may determine a transmission direction corresponding to the flexible symbol based on other configuration information or downlink control information (DCI).

Figure 3A:
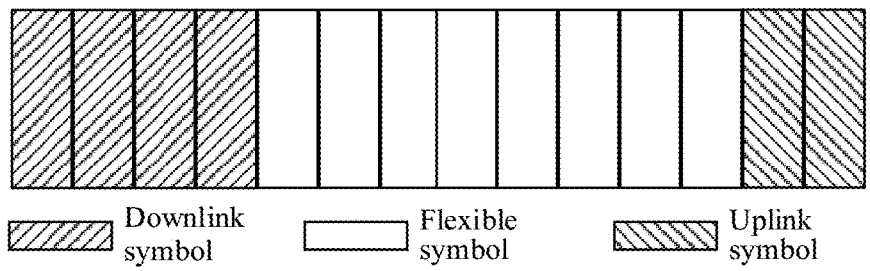
FIG. 3A is a schematic diagram of a slot structure.

For example, a network may configure a slot structure of a slot based on semi-persistent configuration signaling (for example, Radio Resource Control (RRC) signaling). As shown in FIG. 3A, the slot structure of the slot includes four downlink symbols, two uplink symbols and flexible symbols.

Figure 3B:
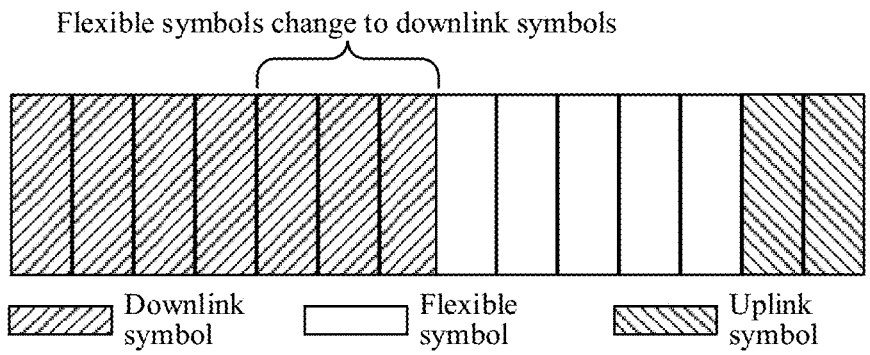
FIG. 3B is a schematic diagram of a slot structure.

In addition, the network device may indicate transmission directions of the flexible symbols in the slot through dynamic signaling (for example, DCI). It is to be noted that the dynamic signaling cannot change transmission directions of the downlink symbols and uplink symbols indicated in the semi-persistent configuration signaling but only can configure the transmission directions of the flexible symbols. For example, as shown in FIG. 3B, the dynamic signaling sent by the network device may indicate that the first seven symbols in the slot are downlink symbols. Namely, the first three flexible symbols in the flexible symbols are configured as downlink symbols through the dynamic signaling.

Figure 4:
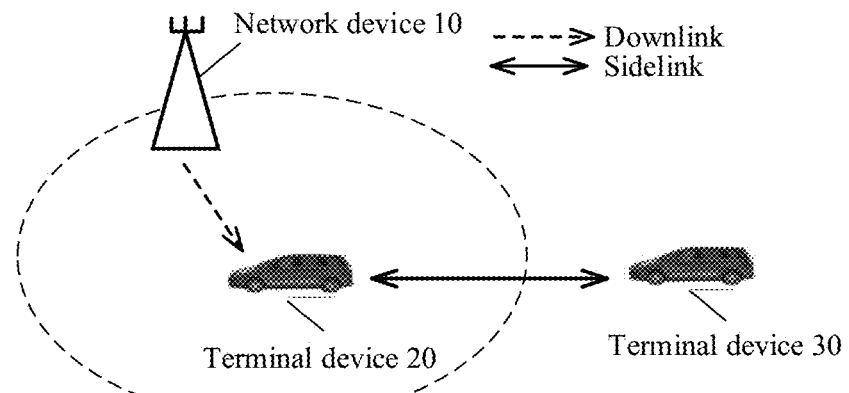
FIG. 4 is a schematic architecture diagram of another application scenario according to an embodiment of the disclosure.

FIG. 4 shows a possible application scenario according to an embodiment of the disclosure. A terminal device 20 in a cell may acquire configuration information of a slot structure based on a described manner and thus determine time-domain positions of a uplink symbol and a downlink symbol of a slot based on the configuration information of the slot structure. The terminal device 20 may perform sidelink transmission in the uplink symbol and receive downlink data from a network in the downlink symbol. However, a terminal device 30 outside the cell cannot acquire the configuration information from the network device, and thus may occupy a downlink slot or the downlink symbol during sidelink transmission, bringing interferences to a terminal device such as the terminal device 20 in the cell.

Accordingly, it is proposed in the embodiments of the disclosure that a first terminal device may send a first sidelink transmission channel to indicate configuration information transmitted by a network device such that a second terminal device outside a cell can acquire the configuration information through the first sidelink transmission channel and communicate with the first terminal device based on the configuration information. In such a manner, a terminal device outside the cell can also acquire the configuration information transmitted by the network device for D2D communication based on the configuration information, so that unnecessary interferences to data transmission of a terminal device in the cell can be avoided, and the data transmission performance of the terminal device is improved.

Figure 5:
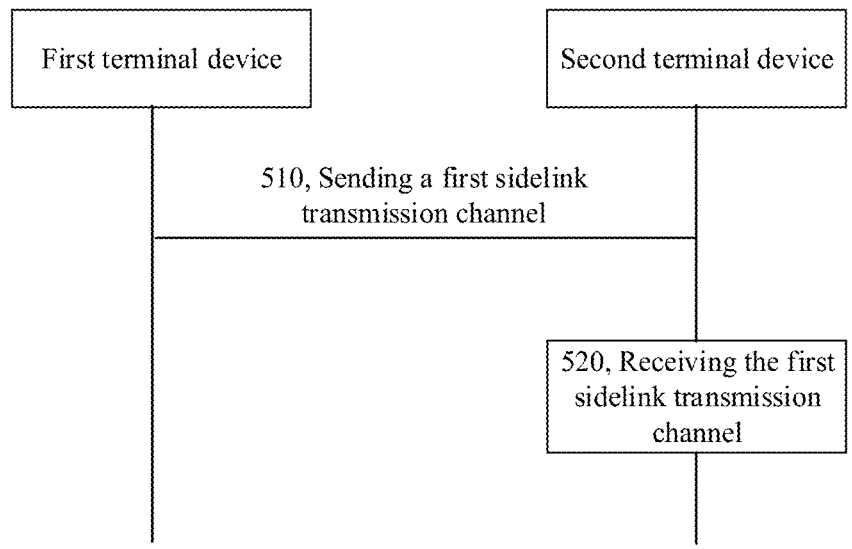
FIG. 5 is a schematic flowchart of a method for transmitting configuration information according to an embodiment of the disclosure.

FIG. 5 is an interaction flowchart of a method for transmitting configuration information according to an embodiment of the disclosure. The method shown in FIG. 5 may be executed by a first terminal device and a second terminal device. The first terminal device may be, for example, the terminal device 20 shown in FIG. 4, and the second terminal device may be, for example, the terminal device 30 shown in FIG. 4.

As shown in FIG. 5, the method for transmitting configuration information includes the following operations.

In operation 510, the first terminal device sends a first sidelink transmission channel.

In operation 520, the second terminal device receives the first sidelink transmission channel.

The first sidelink transmission channel is configured to indicate at least one of the following configuration information: configuration information of a slot format, configuration information of a BWP, configuration information of a synchronization resource on at least one carrier and configuration information of a synchronization resource on at least one BWP.

The configuration information indicated by the first sidelink transmission channel is used for communication between the first terminal device and the second terminal device.

In an implementation, the first terminal device is a terminal device in a cell, and the second terminal device is a terminal device outside the cell. Herein, the second terminal device may be outside the cell where the first terminal device is located and does not belong to another cell. Or, the second terminal device may be in another cell, namely the second terminal device and the first terminal device are in different cells. However, the embodiment of the disclosure is not limited thereto, and the first terminal device may also be a terminal device outside a cell. In an implementation, when the first terminal device is a terminal device outside a cell, the first terminal device may acquire configuration information transmitted by a network device through a terminal device in the cell and transmit the configuration information to the second terminal device. Descriptions will be made below with the condition that the first terminal device is a terminal device in a cell and the second terminal device is a terminal device outside the cell as an example.

It is to be understood that the configuration information indicated by the first sidelink transmission channel may be used for communication between the first terminal device and the second terminal device. Moreover, in some cases, the configuration information may further be used for the second terminal device to communicate with another terminal device in the cell. For example, when the configuration information received by the second terminal device is common configuration information of the cell, namely the configuration information is cell-specific configuration information, the second terminal device may communicate with another terminal device in the cell based on the received configuration information. When the configuration information received by the second terminal device is configuration information specific to the first terminal device, namely the configuration information is UE-specific configuration information, the second terminal device may communicate with the first terminal device based on the received configuration information.

For example, the configuration information may be configuration information of a slot structure. When the first terminal device is a terminal device in a cell, the first terminal device may receive the configuration information of the slot format from a network device and, based on the configuration information, transmit uplink data in an uplink slot and an uplink symbol and transmit downlink data in a downlink slot and a downlink symbol. However, when the second terminal device is outside the cell, since the second terminal device cannot receive the configuration information of the slot structure from the network device, the second terminal device cannot know the slot structure in the cell and thus may occupy the downlink slot or downlink symbol of the first terminal device during sidelink transmission, bringing interferences to data transmission of the first terminal device.

However, according to the method of the embodiment of the disclosure, the first terminal device may send the first sidelink transmission channel to the second terminal device, and the first sidelink transmission channel may indicate the configuration information transmitted by the network device, so that the second terminal device can learn the configuration information and communicate with the first terminal device based on the configuration information. Therefore, interferences to a terminal device in a cell can be avoided, and the data transmission performance of the terminal device is improved.

In an implementation mode, the first sidelink transmission channel may be a physical sidelink broadcast channel (PSBCH). The PSBCH may directly carry the configuration information indicated by the first sidelink transmission channel.

Figure 6A:
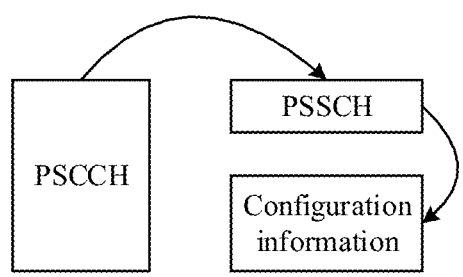
FIG. 6A is a schematic diagram of a first transmission resource according to an embodiment of the disclosure.
Figure 6B:
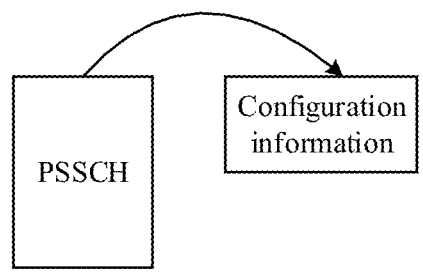
FIG. 6B is a schematic diagram of a first transmission resource according to an embodiment of the disclosure.

In another implementation mode, the first sidelink transmission channel may be a physical sidelink control channel (PSCCH). A physical sidelink shared channel (PSSCH) scheduled by the PSCCH may carry the configuration information indicated by the first sidelink transmission channel, as shown in FIG. 6A for example. Or, the first sidelink transmission channel may be a PSSCH, and the PSSCH may carry the configuration information indicated by the first sidelink transmission channel, as shown in FIG. 6B for example.

In the embodiment of the disclosure, the first sidelink transmission channel may be an existing transmission channel such as the abovementioned PSCCH, PSSCH or PSBCH in a protocol, or may also be a new transmission channel configure to transmit resource configuration information. A format of the first sidelink transmission channel is not limited in the embodiment of the disclosure.

In an implementation, a Modulation and Coding Scheme (MCS) for the configuration information indicated by the first sidelink transmission channel in the first sidelink transmission channel may be pre-configured, or configured by a network device or indicated by the first terminal device.

In an implementation, before the operation 510, the method may further include that the first terminal device determines a first transmission resource. In such case, the operation 510 that the first terminal device sends the first sidelink transmission channel may include that: the first terminal device sends the first sidelink transmission channel on the first transmission resource.

Correspondingly, the method may further include that the second terminal device determines the first transmission resource. In such case, the operation 520 that the second terminal device receives the first sidelink transmission channel may include that: the second terminal device receives the first sidelink transmission channel on the first transmission resource.

That is, the first terminal device does not send the first transmission channel on a random resource but sends the first sidelink transmission channel on the first transmission resource.

In an implementation, the first transmission resource is not configured to transmit other sidelink data but only configured to transmit the configuration information of the slot structure. A sidelink channel transmitting another sidelink data cannot use a resource in the first transmission resource, so that interferences to the first sidelink transmission channel can be avoided.

In an implementation, the first transmission resource may be a pre-configured transmission resource, or a transmission resource configured by a network device or a transmission resource indicated by the first terminal device. Or, the first transmission resource may also be a transmission resource in a receiving resource pool that is pre-configured or configured by a network device.

Furthermore, the operation that the first terminal device determines the first transmission resource In an implementation may include that: the first terminal device selects one or more resources from K candidate resources as the first transmission resource, K being a positive integer. For example, the first terminal device may randomly select one or more candidate resources from the K pre-configured candidate resources of the first transmission resource as the first transmission resource. For another example, when the first terminal device is required to transmit the configuration information of the slot structure at moment n, the first terminal device may select a first available candidate resource after the moment n as the first transmission resource.

Or, In an implementation, the operation that the first terminal device determines the first transmission resource may include that: the first terminal device determines the first transmission resource based on information, pre-stored in the first terminal device, of the first transmission resource.

Or, In an implementation, the method may further include that: the first terminal device receives first indication information from the network device, the first indication information being configured to indicate the first transmission resource. The operation that the first terminal device determines the first transmission resource may include that: the first terminal device determines the first transmission resource based on the first indication information.

That is, the first transmission resource may be one or more resources selected by the terminal device from the K pre-configured candidate resources, and for example, may be randomly selected. Or, the first transmission resource may be pre-stored in the terminal device, for example, predetermined in a protocol. Or, the first transmission resource may be configured by the network device for the terminal device.

The first terminal device, after determining the first transmission resource, may send the first sidelink transmission channel on the first transmission resource, the sidelink transmission channel indicating the configuration information. However, for enabling another terminal device to learn a position of the first transmission resource to acquire the configuration information for sidelink transmission, the method In an implementation may further include that: the first terminal device sends a second sidelink transmission channel, the second sidelink transmission channel carrying resource indication information and the resource indication information being configured to indicate the first transmission resource.

Correspondingly, the method In an implementation may further include that: the second terminal device receives the second sidelink transmission channel, the second sidelink transmission channel carrying the resource indication information and the resource indication information being configured to indicate the first transmission resource. The operation that the second terminal device determines the first transmission resource may include that: the second terminal device determines the first transmission resource based on the second sidelink transmission channel.

Therefore, the terminal device may indicate the first transmission resource to another terminal device through the second sidelink transmission channel to enable the another terminal device to receive the first sidelink transmission channel on the first transmission resource and acquire the configuration information indicated by the first sidelink transmission channel. The second sidelink transmission channel may be, for example, a PSBCH.

For example, an information bit length of a PSBCH in a sidelink is limited, so that a size of information that can be carried every time is limited. Since a slot structure in NR-V2X may change flexibly and the configuration information of the slot structure includes large number of bits, when the PSBCH is not enough to bear the configuration information, the first terminal device may indicate the first transmission resource through the PSBCH and send the first sidelink transmission channel on the first transmission resource to indicate the configuration information to enable the second terminal device to receive the first sidelink transmission channel on the first transmission resource to acquire the configuration information.

The second terminal device may also determine the first transmission resource based on the information, pre-stored in the second terminal device, of the first transmission resource. For example, the first transmission resource may be predetermined in a protocol.

The content in the resource indication information carried in the second sidelink transmission channel will be described below in combination with a first condition to a fourth condition in detail.

First Condition

The resource indication information includes an index of the first transmission resource.

For example, multiple first transmission resources (for example, information of a time-frequency position of each first transmission resource, an occupied time-domain resource size and an occupied frequency-domain resource size) may be pre-configured, and the first transmission resources has respective unique indexes. For example, each first transmission resource has a unique index in a radio frame period, and each unique first transmission resource may be determined through the respective index. The resource indication information sent by the first terminal device may include the index of the first transmission resource configured to transmit the first sidelink transmission channel. The second terminal device, after receiving the resource indication information, may select the first transmission resource indicated by the index from the multiple first transmission resources to receive the first sidelink transmission channel, thereby obtaining the configuration information indicated by the first sidelink transmission channel. The pre-configured multiple first transmission resources may have the same or different time-domain resource sizes and/or frequency-domain resource sizes.

Second Condition

The resource indication information includes information of a first resource pool where the first transmission resource is located and position information of the first transmission resource in the first resource pool.

In an implementation, the resource indication information may further include information of a resource size of the first transmission resource. Or, when the resource indication information does not include the information of the size of the first transmission resource, the size of the first transmission resource may be determined based on pre-configuration or configuration by a network device.

For example, the resource indication information may include the information of the first resource pool where the first transmission resource is located in multiple resource pools that are pre-configured or configured by a network device, for example, including information of a time-frequency position or index of the first resource pool, so that the resource pool where the first transmission resource is located may be determined according to the resource indication information. Moreover, the resource indication information may further include the position information of the first transmission resource in the first resource pool, for example, including information of a time-frequency position or index of the first transmission resource in the first resource pool.

Furthermore, the resource indication information may further include the information of the size of the first transmission resource.

Third Condition

The resource indication information includes the information of the first resource pool where the first transmission resource is located. The first transmission resource is a resource at a specific time-frequency position in the first resource pool.

The first terminal device may determine the time-frequency position occupied by the first transmission resource in the first resource pool based on the information of the first resource pool and information of the specific time-frequency position pre-configured or configured by a network device.

Figure 7:
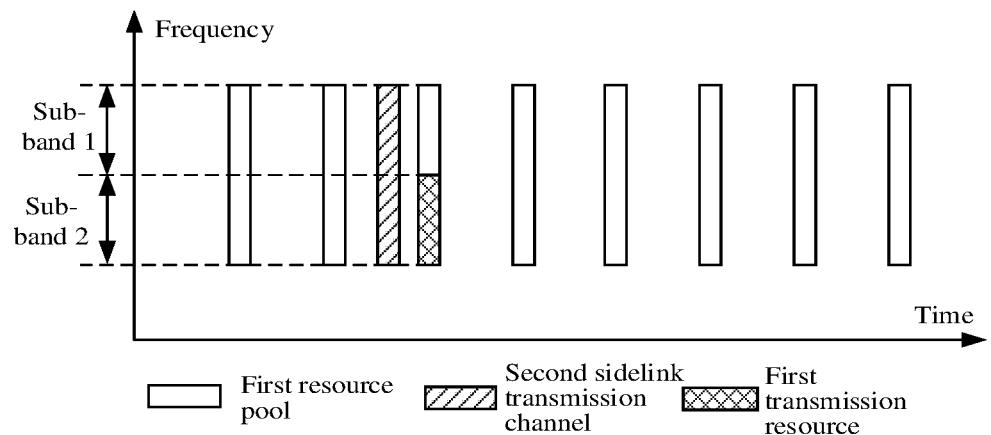
FIG. 7 is a schematic diagram of a first transmission resource according to an embodiment of the disclosure.

For example, the specific time-frequency position may be a first resource, which is available for transmission of the first sidelink transmission channel, starting from a lowest or highest frequency-domain position in an Mth subframe after the second sidelink transmission channel in the first resource pool, M being a positive integer. Preferably, M=1. For example, as shown in FIG. 7, each resource configured to transmit the first sidelink transmission channel occupies a sub-band in frequency domain, and the first transmission resource is in a first subframe after the second sidelink transmission channel in the first resource pool and occupies a sub-band, i.e., sub-band 2, at a position starting from a lowest frequency-domain position in the subframe.

In an implementation, the resource indication information may further include the information of the resource size of the first transmission resource. Or, when the resource indication information does not include the information of the size of the first transmission resource, the size of the first transmission resource may be determined based on pre-configuration or configuration by a network device.

Fourth Condition

The resource indication information includes time-domain and/or frequency-domain information of the first transmission resource.

In an implementation, the time-domain information of the first transmission resource may include at least one of the following information: time-domain index information, time-domain offset information and the information of the time-domain resource size.

The time-domain index information may, for example, indexes of multiple time units occupied by the first transmission resource or an index of a first time-domain unit in multiple time-domain units occupied by the first transmission resource.

The time-domain offset information may be, for example, an offset of the first transmission resource relative to a fixed time-domain position. The fixed time-domain position may be, for example, a subframe position of the PSBCH or a position of a first subframe (i.e., subframe 0) in a radio frame.

The information of the time-domain resource size may be, for example, the number of time-domain units occupied by the first transmission resource.

In an implementation, the frequency-domain information of the first transmission resource may include at least one of the following information: frequency-domain index information, frequency-domain offset information and the information of the frequency-domain resource size.

The frequency-domain index information may be, for example, indexes of multiple frequency-domain units occupied by the first transmission resource or the index of a first frequency-domain unit in the multiple frequency-domain units occupied by the first transmission resource.

The frequency-domain offset information may be, for example, an offset of the first transmission resource relative to a fixed frequency-domain position.

The information of the frequency-domain resource size may be, for example, the number of frequency-domain units occupied by the first transmission resource.

The fixed frequency-domain position may be, for example, a position of a physical resource block (PRB) occupied by the PSBCH at a lowest frequency-domain position, a position of a PRB occupied by the PSBCH at a highest frequency-domain position, a position of a center frequency point of a carrier where the PSBCH is located, a position of a PRB at a lowest frequency-domain position in a carrier where the PSBCH is located and a position of a PRB at a highest frequency-domain position in the carrier where the PSBCH is located, or may also be another specific frequency-domain position.

It is to be understood that the resource indication information may include the information described in any of the first condition to the fourth condition or may also include part or all of the information described in the first condition to the fourth condition. Namely, the first condition to the fourth condition may be executed independently or combined for execution.

It is also to be understood that, in the embodiment of the disclosure, the time-domain unit may include a subframe, a slot, a symbol and the like. The frequency-domain unit may include a sub-band, a resource block group (RBG), a PRB and the like. A sub-band may include multiple continuous PRBs, and an RBG may include multiple continuous PRBs.

In an implementation, in the embodiment of the disclosure, the configuration information of the slot format may include at least one of the following information:

a period of the configuration information of the slot structure;

the number of all-downlink slots in the period;

the number of downlink symbols, other than the all-downlink slots, in the period;

the number of all-uplink slots in the period;

the number of uplink symbols, other than the all-uplink slots, in the period; and a reference subcarrier spacing.

Figure 8:
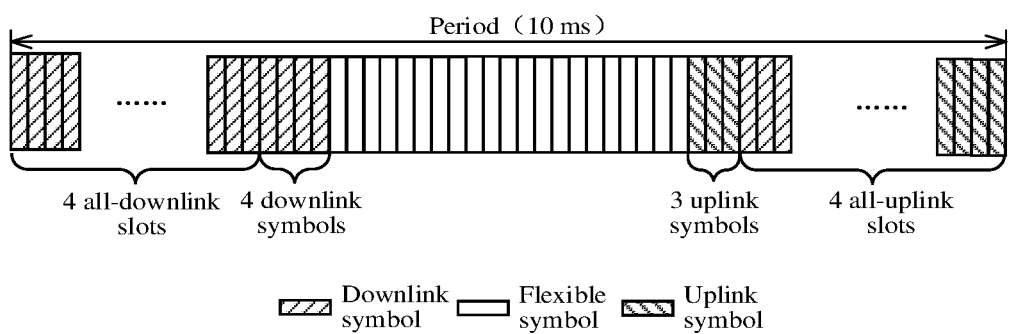
FIG. 8 is a schematic diagram of a slot structure according to an embodiment of the disclosure.

A parameter in the configuration information of the slot format will be described below in combination with FIG. 8 in detail. A downlink-uplink pattern, i.e., a specific time position for transmission of uplink data and a specific time position for transmission of downlink data, may be determined based on the parameter. The period of the configuration information of the slot structure is a period of the pattern. The reference subcarrier spacing is configured to determine a time-domain boundary in the period of the pattern. When a period shown in FIG. 8 is 10 ms and the reference subcarrier spacing is 15 kHz, it is indicated that the period includes 10 slots with slot indexes being 0 to 9 respectively. The all-downlink slot refers to that all time-domain symbols in the slot are downlink symbols. The all-uplink slot refers to that all time-domain symbols in the slot are uplink symbols. The downlink symbol is a symbol only for downlink transmission, and the uplink symbol is a symbol only for uplink transmission.

The number of the all-downlink slots in the period is the number of continuous all-downlink slots starting from a starting position of each pattern, for example, four all-downlink slots shown in FIG. 8. Based on this, the number of the downlink symbols, other than the all-downlink slots, in the period is the number of continuous downlink symbols starting from a starting position in a next slot of the last all-downlink slot, for example, 4 downlink symbols shown in FIG. 8.

The number of the all-uplink slots in the period is the number of continuous all-uplink slots at the end of each pattern, for example, four all-uplink slots shown in FIG. 8. Based on this, the number of the uplink symbols, other than the all-uplink slots, in the period is the number of continuous uplink symbols at the end of a previous slot of the first all-uplink slot, for example, 3 uplink symbols shown in FIG. 8.

Furthermore, In an implementation, the configuration information of the slot format may further include at least one of the following information:
an index of a first slot in the period;
all-downlink symbol indication information, configured to indicate that all symbols in the first slot are downlink symbols;
all-uplink symbol indication information, configured to indicate that all the symbols in the first slot are uplink symbols;
the number of downlink symbols in the first slot; and
the number of uplink symbols in the first slot.

Figure 9A:
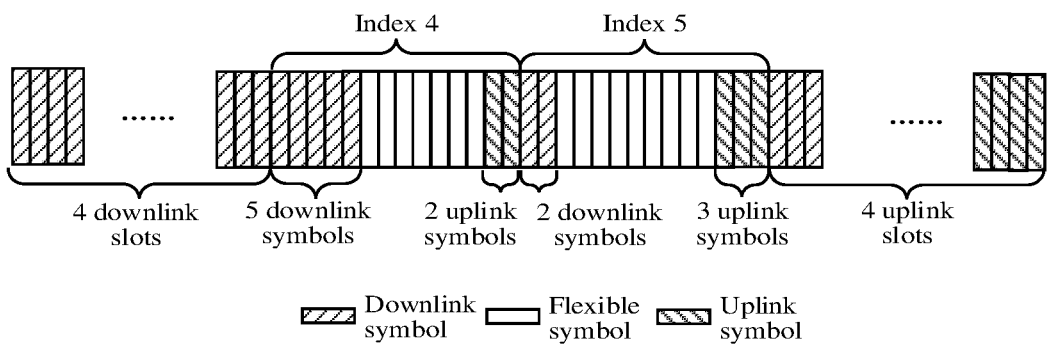
FIG. 9A is a schematic diagram of a slot structure according to an embodiment of the disclosure.
Figure 9B:
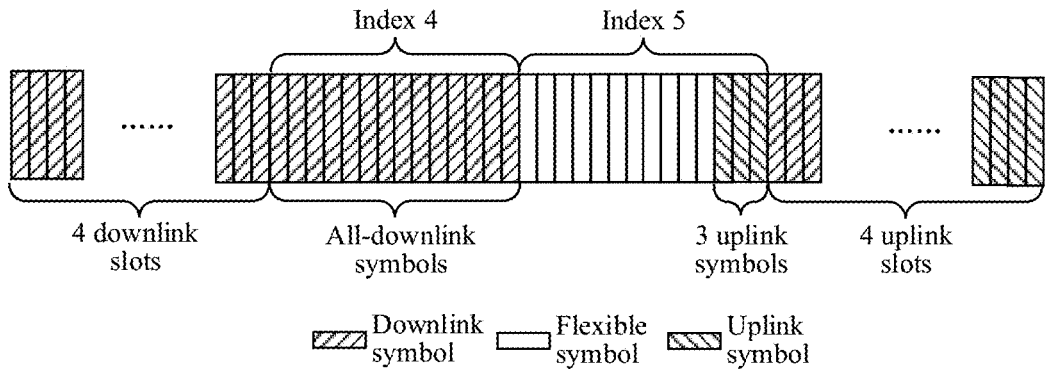
FIG. 9B is a schematic diagram of a slot structure according to an embodiment of the disclosure.

The parameter that the configuration information of the slot format further includes will be described below in combination with FIG. 9A and FIG. 9B in detail. The number of the downlink symbols in the first slot is the number of continuous starting downlink symbols of the first slot. For example, when the index of the first slot is index 4, the downlink symbols in the first slot are five starting downlink symbols in a slot indicated by the index 4. Or, when the index of the first slot is index 5, the downlink symbols in the first slot are two starting downlink symbols in a slot indicated by the index 5.

The number of the uplink symbols in the first slot is the number of continuous ending uplink symbols of the first slot. For example, when the index of the first slot is index 4, the uplink symbols in the first slot are two ending uplink symbols in a slot indicated by the index 4. Or, when the index of the first slot is index 5, the uplink symbols in the first slot are three ending uplink symbols in a slot indicated by the index 5.

The all-downlink symbol indication information represents that all the symbols in the first slot are downlink symbols. For example, all symbols in the slot indicated by the index 4 in FIG. 9 are downlink symbols. The all-uplink symbol indication information represents that all the symbols in the first slot are uplink symbols.

Furthermore, when the network device indicates a specific flexible symbol which has a changed transmission direction, for example, the flexible symbol changes to a downlink symbol or an uplink symbol, to the first terminal device through the dynamic signaling such as DCI, the first terminal device may also transmit such a message to the second terminal device to enable the second terminal device to know the specific flexible symbol with the corresponding transmission direction being changed.

In an implementation, in the embodiment of the disclosure, the configuration information of the BWP may include at least one of the following information:
an index of the BWP;
a frequency-domain position and/or frequency-domain size of the BWP;
a subcarrier spacing in the BWP; and
a cyclic prefix (CP) type of the BWP.

Specifically, a carrier in a cell may be divided into multiple BWPs, and different BWPs may have different subcarrier spacings. Therefore, a terminal device in the cell may send configuration information of these BWPs in the cell to a terminal device outside the cell. The configuration information of the BWP may be information of a frequency-domain position, frequency-domain size, adopted subcarrier spacing size, CP type and the like of each BWP.

In an implementation, the configuration information of the synchronization resource on each carrier in the at least one carrier may include at least one of the following information:
a time-domain position of the synchronization resource on each carrier;
a frequency-domain position of the synchronization resource on each carrier; and
a distribution period of the synchronization resource on each carrier in time domain.

In an implementation, the configuration information of the synchronization resource on each BWP in the at least one BWP may include at least one of the following information:
a time-domain position of the synchronization resource on each BWP;
a frequency-domain position of the synchronization resource on each BWP; and
a distribution period of the synchronization resource on each BWP in the time domain.

The synchronization resource may include a transmission resource of a sidelink synchronization signal (SLSS) and/or a PSBCH.

In LTE-V2X, the frequency-domain position of a synchronization resource is fixedly middle six PRBs of a carrier for transmission. However, in NR-V2X, a position of a synchronization resource on a carrier or a BWP is configurable. When sidelink transmission of a terminal device supports multiple carriers or multiple BWPs, a synchronization resource may have different configurations on different carriers or different BWPs, for example, having different time-domain positions, different frequency-domain positions and different sending periods.

The first sidelink transmission channel sent on a first carrier may be configured to indicate configuration information of a synchronization resource on another carrier. Furthermore, a synchronization resource on the first carrier may be pre-configured, configured by a network device or determined by a terminal device by searching or detection.

Similarly, the first sidelink transmission channel sent on a first BWP may be configured to indicate configuration information of a synchronization resource on another BWP. Furthermore, a synchronization resource on the first BWP may be pre-configured, or configured by a network device or determined by a terminal device by searching or detection.

It is to be understood that, in the embodiment of the disclosure, the configuration information sent on the first sidelink transmission channel may include the configuration information of the slot structure, the configuration information of the BWP and the synchronization information of the synchronization resource, and may further include other configuration information that the second terminal device cannot obtain from the network.

The second terminal device, after receiving the configuration information indicated by the first sidelink transmission channel, may further continue transmitting the configuration information to another terminal device outside the cell such that the configuration information can be acquired by more terminal devices.

It is to be noted that each embodiment described in the application and/or technical features in each embodiment may be freely combined without conflict and combined technical solutions shall also fall within the scope of protection of the disclosure.

In addition, "pre-configuration" mentioned in the embodiments of the disclosure refers to predetermination, for example, specification in a protocol, or may refer to predefinition. "Configuration by a network device" refers to determination by a network device and indication to a terminal device by the network device.

It is to be understood that, in various embodiments of the disclosure, a magnitude of a sequence number of each process does not mean an execution sequence and the execution sequence of each process should be determined by its function and an internal logic and should not form any limit to an implementation process of the embodiments of the disclosure.

The communication method according to the embodiments of the disclosure is described above in detail and a device according to the embodiments of the disclosure will be described below in combination with FIG. 10 to FIG. 14. The technical characteristics described in the method embodiments are applied to the following device embodiments.

Figure 10:
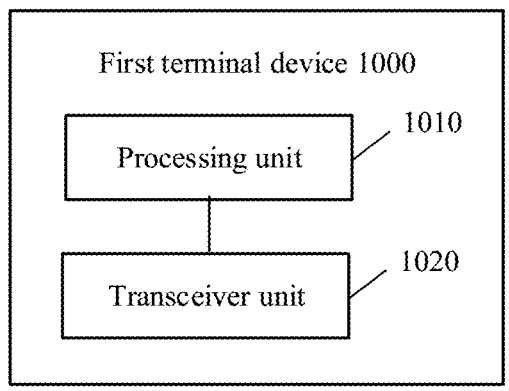
FIG. 10 is a schematic block diagram of a first terminal device according to an embodiment of the disclosure.

FIG. 10 is a schematic block diagram of a terminal device 1000 according to an embodiment of the disclosure. The terminal device is a first terminal device. As shown in FIG. 10, the first terminal device 1000 includes a processing unit 1010 and a transceiver unit 1020.

The processing unit is configured to generate at least one of the following configuration information: configuration information of a slot format, configuration information of a BWP, configuration information of a synchronization resource on at least one carrier and configuration information of a synchronization resource on at least one BWP.

The transceiver unit is configured to send a first sidelink transmission channel. The first sidelink transmission channel is configured to indicate the configuration information generated by the processing unit, and the configuration information indicated by the first sidelink transmission channel is used for communication between the first terminal device and a second terminal device.

Accordingly, the first terminal device may send the first sidelink transmission channel to indicate the configuration information transmitted by a network device such that the second terminal device outside a cell can acquire the configuration information through the first sidelink transmission channel and communicate with the first terminal device based on the configuration information. In such a manner, more terminal devices outside the cell can also acquire the configuration information transmitted by the network device for D2D communication based on the configuration information, so that unnecessary interferences to data transmission of a terminal device in the cell can be avoided, and the data transmission performance of the terminal device is improved.

In an implementation, the processing unit 1010 is further configured to determine a first transmission resource.

The transceiver unit 1020 is specifically configured to send the first sidelink transmission channel on the first transmission resource.

In an implementation, the processing unit 1010 is specifically configured to select one or more resources from K candidate resources as the first transmission resource, K being a positive integer.

In an implementation, the processing unit 1010 is specifically configured to determine the first transmission resource based on information, pre-stored in the first terminal device, of the first transmission resource.

In an implementation, the transceiver unit 1020 is further configured to receive first indication information from a network device, the first indication information being configured to indicate the first transmission resource.

The processing unit 1010 is specifically configured to determine the first transmission resource based on the first indication information.

In an implementation, the first transmission resource is only used to send the first sidelink transmission channel.

In an implementation, the transceiver unit 1020 is further configured to send a second sidelink transmission channel, the second sidelink transmission channel carrying resource indication information and the resource indication information being configured to indicate the first transmission resource.

In an implementation, the resource indication information may include an index of the first transmission resource.

In an implementation, the resource indication information may include information of a first resource pool where the first transmission resource is located and position information of the first transmission resource in the first resource pool.

In an implementation, the resource indication information may include the information of the first resource pool where the first transmission resource is located. The first transmission resource is a first resource, which is available for transmission of the first sidelink transmission channel, starting from a lowest frequency-domain position in an Mth subframe after the second sidelink transmission channel in the first resource pool, M being a positive integer.

In an implementation, the resource indication information may include time-domain and/or frequency-domain information of the first transmission resource.

In an implementation, the time-domain information of the first transmission resource may include at least one of the following information: time-domain index information, time-domain offset information and information of a time-domain resource size. The time-domain index information may be an index of a time unit occupied by the first transmission resource, the time-domain offset information may be an offset of the first transmission resource relative to a fixed time-domain position and the information of the time-domain resource size may be the number of time-domain units occupied by the first transmission resource.

In an implementation, the frequency-domain information of the first transmission resource may include at least one of the following information: frequency-domain index information, frequency-domain offset information and information of a frequency-domain resource size. the frequency-domain index information may be an index of a frequency-domain unit occupied by the first transmission resource, the frequency-domain offset information may be an offset of the first transmission resource relative to a fixed frequency-domain position and the information of the frequency-domain resource size may be the number of frequency-domain units occupied by the first transmission resource.

In an implementation, the second sidelink transmission channel may be a PSBCH.

In an implementation, the first sidelink transmission channel may be a PSCCH, and a PSSCH scheduled by the PSCCH carries the configuration information indicated by the first sidelink transmission channel.

In an implementation, the first sidelink transmission channel may be a PSSCH, the PSSCH carrying the configuration information indicated by the first sidelink transmission channel.

In an implementation, the first sidelink transmission channel may be a PSBCH.

In an implementation, the configuration information of the slot format may include at least one of the following information: a period of configuration information of a slot structure; the number of all-downlink slots in the period; the number of downlink symbols, other than the all-downlink slots, in the period; the number of all-uplink slots in the period; the number of uplink symbols, other than the all-uplink slots, in the period; and a reference subcarrier spacing for determining the slot format.

In an implementation, the configuration information of the slot format may further include at least one of the following information: an index of a first slot in the period; the number of downlink symbols in the first slot; the number of uplink symbols in the first slot; all-downlink symbol indication information, configured to indicate that all symbols in the first slot are downlink symbols; and all-uplink symbol indication information, configured to indicate that all the symbols in the first slot are uplink symbols.

In an implementation, the configuration information of the BWP may include at least one of the following information: an index of the BWP; a frequency-domain position and/or frequency-domain size of the BWP; a subcarrier spacing in the BWP; and a CP type of the BWP.

In an implementation, the configuration information of the synchronization resource on each carrier in the at least one carrier may include at least one of the following information: a time-domain position of the synchronization resource on each carrier; a frequency-domain position of the synchronization resource on each carrier; and a distribution period of the synchronization resource on each carrier in time domain.

In an implementation, the configuration information of the synchronization resource on each BWP in the at least one BWP may include at least one of the following information: a time-domain position of the synchronization resource on each BWP; a frequency-domain position of the synchronization resource on each BWP; and a distribution period of the synchronization resource on each BWP in the time domain.

In an implementation, the first terminal device may be a terminal device in a cell, and the second terminal device may be a terminal device outside the cell.

It is to be understood that the terminal device 1000 may execute corresponding operations executed by the first terminal device in the method 500 and, for simplicity, will not be elaborated herein.

Figure 11:
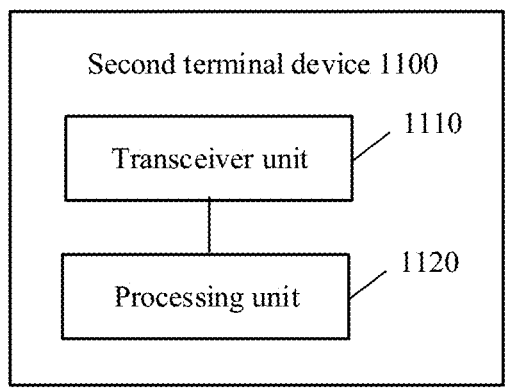
FIG. 11 is a schematic block diagram of a second terminal device according to an embodiment of the disclosure.

FIG. 11 is a schematic block diagram of a terminal device 1100 according to an embodiment of the disclosure. The terminal device is a second terminal device. As shown in FIG. 11, the second terminal device 1100 includes a transceiver unit 1110 and a processing unit 1120.

The transceiver unit 1110 is configured to receive a first sidelink transmission channel. The first sidelink transmission channel is configured to indicate at least one of the following configuration information: configuration information of a slot format, configuration information of a BWP, configuration information of a synchronization resource on at least one carrier and configuration information of a synchronization resource on at least one BWP. The configuration information indicated by the first sidelink transmission channel is used for communication between the first terminal device and a second terminal device.

The processing unit 1120 is configured to process the configuration information received by the transceiver unit 1110.

The second terminal device may receive configuration information notified by another terminal device, for example, configuration information of a slot structure, configuration information of a BWP and configuration information of a synchronization resource on a carrier, and thus may obtain the configuration information and perform D2D communication based on the configuration information. Interferences to the another terminal device using the configuration information can be avoided.

In an implementation, the processing unit 1120 is further configured to determine a first transmission resource. The transceiver unit 1110 is specifically configured to receive the first sidelink transmission channel on the first transmission resource.

In an implementation, the first transmission resource is only used to receive the first sidelink transmission channel.

In an implementation, the transceiver unit 1110 is further configured to receive a second sidelink transmission channel. The second sidelink transmission channel may carry resource indication information and the resource indication information being configured to indicate the first transmission resource. The processing unit 1120 is specifically configured to determine the first transmission resource based on the second sidelink transmission channel.

In an implementation, the resource indication information may include an index of the first transmission resource.

In an implementation, the resource indication information may include information of a first resource pool where the first transmission resource is located and position information of the first transmission resource in the first resource pool.

In an implementation, the resource indication information may include the information of the first resource pool where the first transmission resource is located. The first transmission resource is a first resource, which is available for transmission of the first sidelink transmission channel, starting from a lowest frequency-domain position in an Mth subframe after the second sidelink transmission channel in the first resource pool, M being a positive integer.

In an implementation, the resource indication information may include time-domain and/or frequency-domain information of the first transmission resource.

In an implementation, the time-domain information of the first transmission resource may include at least one of the following information: time-domain index information, time-domain offset information and information of a time-domain resource size. The time-domain index information may be an index of a time unit occupied by the first transmission resource, the time-domain offset information may be an offset of the first transmission resource relative to a fixed time-domain position and the information of the time-domain resource size may be the number of time-domain units occupied by the first transmission resource.

In an implementation, the frequency-domain information of the first transmission resource may include at least one of the following information: frequency-domain index information, frequency-domain offset information and information of a frequency-domain resource size. The frequency-domain index information may be an index of a frequency-domain unit occupied by the first transmission resource, the frequency-domain offset information may be an offset of the first transmission resource relative to a fixed frequency-domain position, and the information of the frequency-domain resource size may be the number of frequency-domain units occupied by the first transmission resource.

In an implementation, the second sidelink transmission channel may be a PSBCH.

In an implementation, the processing unit 1120 is specifically configured to determine the first transmission resource based on information, pre-stored in the second terminal device, of the first transmission resource.

In an implementation, the first sidelink transmission channel may be a PSCCH, and a PSSCH scheduled by the PSCCH carries the configuration information indicated by the first sidelink transmission channel.

In an implementation, the first sidelink transmission channel may be a PSSCH, the PSSCH carrying the configuration information indicated by the first sidelink transmission channel.

In an implementation, the first sidelink transmission channel may be a PSBCH.

In an implementation, the configuration information of the slot format may include at least one of the following information: a period of configuration information of a slot structure; the number of all-downlink slots in the period; the number of downlink symbols, other than the all-downlink slots, in the period; the number of all-uplink slots in the period; the number of uplink symbols, other than the all-uplink slots, in the period; and a reference subcarrier spacing for determining the slot format.

In an implementation, the configuration information of the slot format may further include at least one of the following information: an index of a first slot in the period; the number of downlink symbols in the first slot; the number of uplink symbols in the first slot; all-downlink symbol indication information, configured to indicate that all symbols in the first slot are downlink symbols; and all-uplink symbol indication information, configured to indicate that all the symbols in the first slot are uplink symbols.

In an implementation, the configuration information of the BWP may include at least one of the following information: an index of the BWP; a frequency-domain position and/or frequency-domain size of the BWP; a subcarrier spacing in the BWP; and a CP type of the BWP.

In an implementation, the configuration information of the synchronization resource on each carrier in the at least one carrier may include at least one of the following information: a time-domain position of the synchronization resource on each carrier; a frequency-domain position of the synchronization resource on each carrier; and a distribution period of the synchronization resource on each carrier in time domain.

In an implementation, the configuration information of the synchronization resource on each BWP in the at least one BWP may include at least one of the following information: a time-domain position of the synchronization resource on each BWP; a frequency-domain position of the synchronization resource on each BWP; and a distribution period of the synchronization resource on each BWP in the time domain.

In an implementation, the first terminal device may be a terminal device in a cell, and the second terminal device may be a terminal device outside the cell.

It is to be understood that the terminal device 1100 may execute corresponding operations executed by the second terminal device in the method 500 and, for simplicity, will not be elaborated herein.

Figure 12:
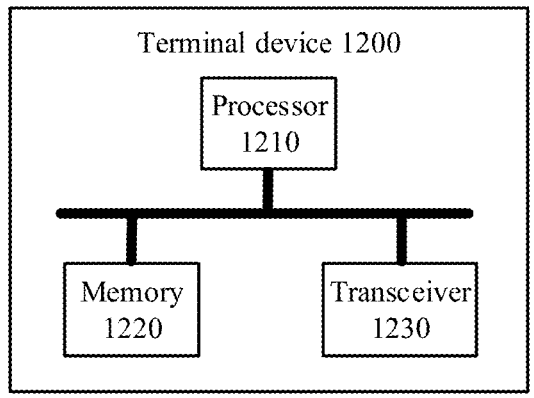
FIG. 12 is a schematic structure diagram of a terminal device according to an embodiment of the disclosure.

FIG. 12 is a schematic structure diagram of a terminal device 1200 according to an embodiment of the disclosure.

The terminal device 1200 shown in FIG. 12 includes a processor 1210, and the processor 1210 may call and run a computer program in a memory to implement the method in the embodiment of the disclosure.

In an implementation, as shown in FIG. 12, the terminal device 1200 may further include the memory 1220. The processor 1210 may call and run the computer program in the memory 1220 to implement the method in the embodiments of the disclosure.

The memory 1220 may be an independent device independent of the processor 1210 and may also be integrated into the processor 1210.

In an implementation, as shown in FIG. 12, the terminal device 1200 may further include a transceiver 1230, and the processor 1210 may control the transceiver 1230 to communicate with another device, specifically sending information or data to the another device or receiving information or data sent by the another device.

The transceiver 1230 may include a transmitter and a receiver. The transceiver 1230 may further include antennae, and the number of the antennae may be one or more.

In an implementation, the terminal device 1200 may specifically be the first terminal device of the embodiments of the disclosure, and the terminal device 1200 may implement corresponding flows implemented by the first terminal device in each method of the embodiments of the disclosure. For simplicity, elaborations are omitted herein.

In an implementation, the terminal device 1200 may specifically be the second terminal device of the embodiments of the disclosure, and the terminal device 1200 may implement corresponding flows implemented by the second terminal device in each method of the embodiments of the disclosure. For simplicity, elaborations are omitted herein.

Figure 13:
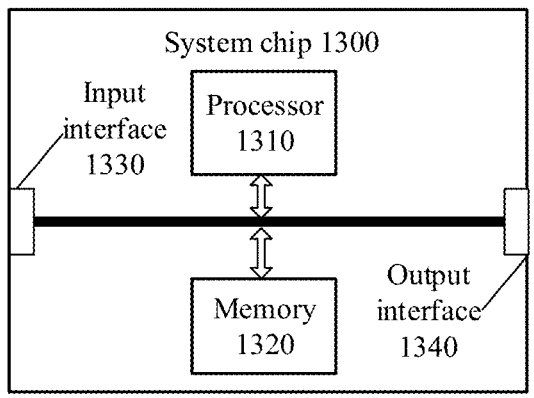
FIG. 13 is a schematic structure diagram of a chip according to another embodiment of the disclosure.

FIG. 13 is a schematic structure diagram of a chip according to another embodiment of the disclosure. The chip 1300 shown in FIG. 13 includes a processor 1310, and the processor 1310 may call and run a computer program in a memory to implement the method in the embodiments of the disclosure.

In an implementation, as shown in FIG. 13, the chip 1300 may further include the memory 1320. The processor 1310 may call and run the computer program in the memory 1320 to implement the method in the embodiments of the disclosure.

The memory 1320 may be an independent device independent of the processor 1310 and may also be integrated into the processor 1310.

In an implementation, the chip 1300 may further include an input interface 1330. The processor 1310 may control the input interface 1330 to communicate with another device or chip, specifically acquiring information or data sent by the another device or chip.

In an implementation, the chip 1300 may further include an output interface 1340. The processor 1310 may control the output interface 1340 to communicate with the another device or chip, specifically outputting information or data sent by the another device or chip.

In an implementation, the chip may be applied to the first terminal device of the embodiments of the disclosure, and the chip may implement corresponding flows implemented by the first terminal device in each method of the embodiments of the disclosure. For simplicity, elaborations are omitted herein.

In an implementation, the chip may be applied to the second terminal device of the embodiments of the disclosure, and the chip may implement corresponding flows implemented by the second terminal device in each method of the embodiments of the disclosure. For simplicity, elaborations are omitted herein.

It is to be understood that the chip mentioned in the embodiment of the disclosure may also be called a system-level chip, a system chip, a chip system or a system on chip, etc.

It is to be understood that the processor in the embodiment of the disclosure may be an integrated circuit chip and has a signal processing capacity. In an implementation process, each operation of the method embodiments may be completed by an integrated logical circuit of hardware in the processor or an instruction in a software form. The processor may be a universal processor, a Digital Signal Processor (DSP), an Application Specific Integrated Circuit (ASIC), a Field Programmable Gate Array (FPGA) or another programmable logical device, discrete gate or transistor logical device and discrete hardware component. Each method, operation and logical block diagram disclosed in the embodiments of the disclosure may be implemented or executed. The universal processor may be a microprocessor or the processor may also be any conventional processor and the like. The operations of the method disclosed in combination with the embodiments of the disclosure may be directly embodied to be executed and completed by a hardware decoding processor or executed and completed by a combination of hardware and software modules in the decoding processor. The software module may be located in a mature storage medium in this field such as a Random Access Memory (RAM), a flash memory, a Read-Only Memory (ROM), a Programmable ROM (PROM) or Electrically Erasable PROM (EEPROM) and a register. The storage medium is located in a memory, and the processor reads information in the memory, and completes the operations of the method in combination with hardware.

It can be understood that the memory in the embodiment of the disclosure may be a volatile memory or a nonvolatile memory, or may include both the volatile and nonvolatile memories. The nonvolatile memory may be a ROM, a PROM, an Erasable PROM (EPROM), an EEPROM or a flash memory. The volatile memory may be a RAM, and is used as an external high-speed cache. It is exemplarily but unlimitedly described that RAMs in various forms may be adopted, such as a Static RAM (SRAM), a Dynamic RAM (DRAM), a Synchronous DRAM (SDRAM), a Double Data Rate SDRAM (DDRSDRAM), an Enhanced SDRAM (ESDRAM), a Synchlink DRAM (SLDRAM) and a Direct Rambus RAM (DR RAM). It is to be noted that the memory of a system and method described in the disclosure is intended to include, but not limited to, memories of these and any other proper types.

It is to be understood that the memory is exemplarily but unlimitedly described. For example, the memory in the embodiments of the disclosure may also be an SRAM, a DRAM, an SDRAM, a DDR SDRAM, an ESDRAM, an SLDRAM and a DR RAM. That is, the memory in the embodiments of the disclosure is intended to include, but not limited to, memories of these and any other proper types.

Figure 14:
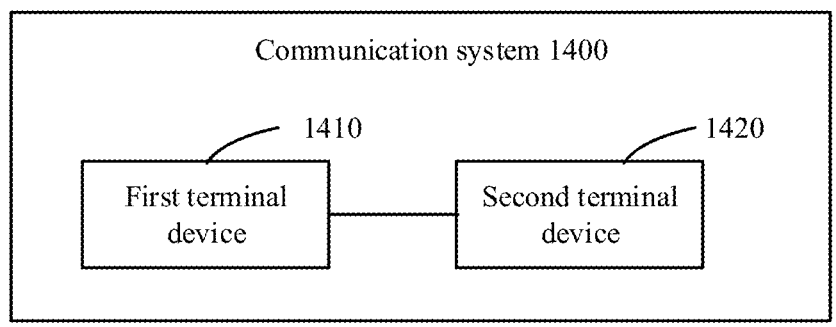
FIG. 14 is a schematic block diagram of a communication system according to an embodiment of the disclosure.

FIG. 14 is a schematic block diagram of a communication system 1400 according to an embodiment of the disclosure. As shown in FIG. 14, the communication system 1400 includes a first terminal device 1410 and a second terminal device 1420.

The first terminal device 1410 is configured to send a first sidelink transmission channel. The first sidelink transmission channel is configured to indicate at least one of the following configuration information: configuration information of a slot format, configuration information of a BWP, configuration information of a synchronization resource on at least one carrier and configuration information of a synchronization resource on at least one BWP. The configuration information indicated by the first sidelink transmission channel is used for communication between the first terminal device and the second terminal device.

The second terminal device 1420 is configured to receive the first sidelink transmission channel. The first sidelink transmission channel is configured to indicate at least one of the following configuration information: the configuration information of the slot format, the configuration information of the BWP, the configuration information of the synchronization resource on the at least one carrier and the configuration information of the synchronization resource on the at least one BWP. The configuration information indicated by the first sidelink transmission channel is used for communication between the first terminal device and the second terminal device.

The first terminal device 1410 may be configured to realize corresponding functions realized by the first terminal device in the method 500. A composition of the first terminal device 1410 may be shown as the first terminal device 1000 in FIG. 10. For simplicity, elaborations are omitted herein.

The second terminal device 1420 may be configured to realize corresponding functions realized by the second terminal device in the method 500. A composition of the second terminal device 1420 may be shown as the second terminal device 1100 in FIG. 11. For simplicity, elaborations are omitted herein.

The embodiments of the disclosure also provide a computer-readable storage medium, which is configured to store a computer program. In an implementation, the computer-readable storage medium may be applied to a first terminal device in the embodiments of the disclosure, and the computer program enables a computer to execute corresponding flows implemented by the first terminal device in each method of the embodiments of the disclosure. For simplicity, elaborations are omitted herein. In an implementation, the computer-readable storage medium may be applied to a second terminal device in the embodiments of the disclosure, and the computer program enables a computer to execute corresponding flows implemented by the second terminal device in each method of the embodiments of the disclosure. For simplicity, elaborations are omitted herein.

The embodiments of the disclosure also provide a computer program product, which includes a computer program instruction. In an implementation, the computer program product may be applied to a first terminal device in the embodiments of the disclosure, and the computer program instruction enables the computer to execute corresponding flows implemented by the first terminal device in each method of the embodiments of the disclosure. For simplicity, elaborations are omitted herein. In an implementation, the computer program product may be applied to a second terminal device in the embodiments of the disclosure, and the computer program instruction enables the computer to execute corresponding flows implemented by the second terminal device in each method of the embodiments of the disclosure. For simplicity, elaborations are omitted herein.

The embodiments of the disclosure also provide a computer program. In an implementation, the computer program may be applied to a first terminal device in the embodiments of the disclosure, and the computer program runs in the computer to enable the computer to execute corresponding flows implemented by the first terminal device in each method of the embodiments of the disclosure. For simplicity, elaborations are omitted herein. In an implementation, the computer program may be applied to a second terminal device in the embodiments of the disclosure, and the computer program runs in the computer to enable the computer to execute corresponding flows implemented by the second terminal device in each method of the embodiments of the disclosure. For simplicity, elaborations are omitted herein.

It is to be understood that terms "system" and "network" in the disclosure may usually be exchanged in the disclosure. In the disclosure, term "and/or" is only an association relationship describing associated objects and represents that three relationships may exist. For example, A and/or B may represent three conditions: i.e., independent existence of A, existence of both A and B and independent existence of B. In addition, character "/" in the disclosure usually represents that previous and next associated objects form an "or" relationship.

It is also to be understood that, in the embodiments of disclosure, "B corresponding to A" represents that B is associated with A and B may be determined according to A. It is also to be understood that determining B according to A does not mean that B is determined only according to A and B may also be determined according to A and/or other information.

Those of ordinary skill in the art may realize that the units and algorithm operations of each example described in combination with the embodiments disclosed in the disclosure may be implemented by electronic hardware or a combination of computer software and the electronic hardware. Whether these functions are executed in a hardware or software manner depends on specific applications and design constraints of the technical solutions. Professionals may realize the described functions for each specific application by use of different methods, but such realization shall fall within the scope of the disclosure.

Those skilled in the art may clearly learn about that specific working processes of the system, device and unit described above may refer to the corresponding processes in the method embodiment and will not be elaborated herein for convenient and brief description.

In some embodiments provided by the application, it is to be understood that the disclosed system, device and method may be implemented in another manner. For example, the device embodiment described above is only schematic, and for example, division of the units is only logic function division, and other division manners may be adopted during practical implementation. For example, multiple units or components may be combined or integrated into another system, or some characteristics may be neglected or not executed. In addition, coupling or direct coupling or communication connection between each displayed or discussed component may be indirect coupling or communication connection, implemented through some interfaces, of the device or the units, and may be electrical and mechanical or adopt other forms.

The units described as separate parts may or may not be physically separated. Parts displayed as units may or may not be physical units, and namely may be located in the same place, or may also be distributed to multiple network units. Part or all of the units may be selected to achieve the purpose of the solutions of the embodiments according to a practical requirement.

In addition, each functional unit in each embodiment of the disclosure may be integrated into a processing unit, each unit may also physically exist independently, and two or more than two units may also be integrated into a unit.

When being realized in form of software functional unit and sold or used as an independent product, the function may also be stored in a computer-readable storage medium. Based on such an understanding, the technical solutions of the disclosure substantially or parts making contributions to the conventional art or part of the technical solutions may be embodied in form of software product, and the computer software product is stored in a storage medium, including a plurality of instructions configured to enable a computer device (which may be a personal computer, a server, a network device or the like) to execute all or part of the operations of the method in each embodiment of the disclosure. The storage medium includes: various media capable of storing program codes such as a U disk, a mobile hard disk, a ROM, a RAM, a magnetic disk or an optical disk.

Accordingly, in the embodiments of the disclosure, a first terminal device may send a first sidelink transmission channel to indicate configuration information transmitted by a network device such that a second terminal device outside a cell may acquire the configuration information through the first sidelink transmission channel and communicate with the first terminal device based on the configuration information. In such a manner, more terminal devices outside the cell also can acquire the configuration information transmitted by the network device for D2D communication based on the configuration information, so that unnecessary interference to data transmission of a terminal device in the cell can be avoided, and the data transmission performance of the terminal device can be improved.

The above is only the specific implementation mode of the disclosure and not intended to limit the scope of protection of the disclosure. Any variations or replacements apparent to those skilled in the art within the technical scope disclosed by the application shall fall within the scope of protection of the disclosure. Therefore, the scope of protection of the disclosure shall be subject to the scope of protection of the claims.

The invention claimed is:

1. A method for transmitting configuration information, comprising:
    sending, by a first terminal device, a first sidelink transmission channel, the first sidelink transmission channel being configured to indicate configuration information of a slot format, wherein the configuration information indicated by the first sidelink transmission channel is used for communication between the first terminal device and a second terminal device,
    wherein the configuration information of the slot format comprises: a period of configuration information of a slot structure,
    wherein the configuration information of the slot format is used for determining time-domain positions of an uplink symbol in a slot.

2. The method of claim 1, further comprising:
    determining, by the first terminal device, a first transmission resource,
    wherein sending, by the first terminal device, the first sidelink transmission channel comprises:
        sending, by the first terminal device, the first sidelink transmission channel on the first transmission resource.

3. The method of claim 2, wherein determining, by the first terminal device, the first transmission resource comprises:

determining, by the first terminal device, the first transmission resource based on information, pre-stored in the first terminal device, of the first transmission resource.

4. The method of claim 2, further comprising:
receiving, by the first terminal device, first indication information from a network device, the first indication information being configured to indicate the first transmission resource,
wherein determining, by the first terminal device, the first transmission resource comprises:
determining, by the first terminal device, the first transmission resource based on the first indication information.

5. The method of claim 2, wherein the first transmission resource is only used to send the first sidelink transmission channel.

6. The method of claim 1, wherein the first sidelink transmission channel is a physical sidelink broadcast channel (PSBCH).

7. A method for transmitting configuration information, comprising:
receiving, by a second terminal device, a first sidelink transmission channel, the first sidelink transmission channel being configured to indicate configuration information of a slot format,
wherein the configuration information indicated by the first sidelink transmission channel is used for communication between a first terminal device and the second terminal device,
wherein the configuration information of the slot format comprises: a period of configuration information of a slot structure,
wherein the configuration information of the slot format is used for determining time-domain positions of an uplink symbol in a slot.

8. The method of claim 7, further comprising:
determining, by the second terminal device, a first transmission resource,
wherein receiving, by the second terminal device, the first sidelink transmission channel comprises:
receiving, by the second terminal device, the first sidelink transmission channel on the first transmission resource.

9. The method of claim 8, wherein the first transmission resource is only used to receive the first sidelink transmission channel.

10. The method of claim 8, further comprising:
receiving, by the second terminal device, a second sidelink transmission channel, the second sidelink transmission channel carrying resource indication information and the resource indication information being configured to indicate the first transmission resource,
wherein determining, by the second terminal device, the first transmission resource comprises:
determining, by the second terminal device, the first transmission resource based on the second sidelink transmission channel.

11. The method of claim 7, wherein the first sidelink transmission channel is a physical sidelink broadcast channel (PSBCH).

12. A first terminal device, comprising:
a processor, configured to generate configuration information of a slot format; and
a transceiver, configured to send a first sidelink transmission channel, wherein the first sidelink transmission channel is configured to indicate the configuration information generated by the processor and the configuration information indicated by the first sidelink transmission channel is used for communication between the first terminal device and a second terminal device,
wherein the configuration information of the slot format comprises: a period of configuration information of a slot structure,
wherein the configuration information of the slot format is used for determining time-domain positions of an uplink symbol in a slot.

13. The first terminal device of claim 12, wherein
the processor is further configured to determine a first transmission resource; and
the transceiver is specifically configured to send the first sidelink transmission channel on the first transmission resource.

14. The first terminal device of claim 13, wherein the processor is specifically configured to:
determine the first transmission resource based on information, pre-stored in the first terminal device, of the first transmission resource.

15. The first terminal device of claim 13, wherein
the transceiver is further configured to receive first indication information from a network device, the first indication information being configured to indicate the first transmission resource; and
the processor is specifically configured to determine the first transmission resource based on the first indication information.

16. The first terminal device of claim 13, wherein the first transmission resource is only used to send the first sidelink transmission channel.

17. The first terminal device of claim 12, wherein the first sidelink transmission channel is a physical sidelink broadcast channel (PSBCH).

* * * * *